T858,008

BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JANUARY 7, 1969

858 O.G. 42

690,057

POLY[4-(4'-PHENOXY)-BENZAMIDE] AND SOLUTIONS, AND SHAPED ARTICLE MADE THEREFROM

Rudolph Henry Michel, Tonawanda, N.Y., assignor to E. I. du Pont de Nemours and Company, Wilmington, Del., a corporation of Delaware

Filed Dec. 13, 1967. Published Jan. 7, 1969

Class 260—30.2

No Drawing. 9 Pages Specification

Poly [4-(4'-phenoxy) benzamide] characterized by repeating units of the formula:

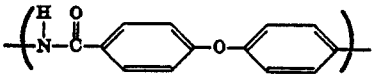

having an inherent viscosity of at least about 0.2. Solutions thereof, e.g., 5 to 20 weight percent, in amides, e.g., N,N-dimethylacetamide or ureas, e.g., N,N,N',N'-tetramethylurea, preferably with about 3 to 7 percent lithium chloride is disclosed as well as shaped articles, e.g., films and fibers. Polymerization techniques using salts of the formula:

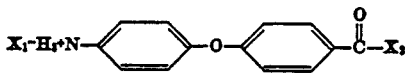

wherein $X_1$ represents arylsulfonate, alkylsulfonate, acid sulfate, or a halogen radical and $X_2$ represent a halogen radical, are also described. Polymer solutions may also be prepared using solvent media such as N-methylpyrrolidone-2; N,N-dimethylpropionamide; N,N-dimethylbutyramide; N,N-dimethylisobutyramide and 1,3-dimethylimidazolidinone-2.